United States Patent Office 3,183,697
Patented May 18, 1965

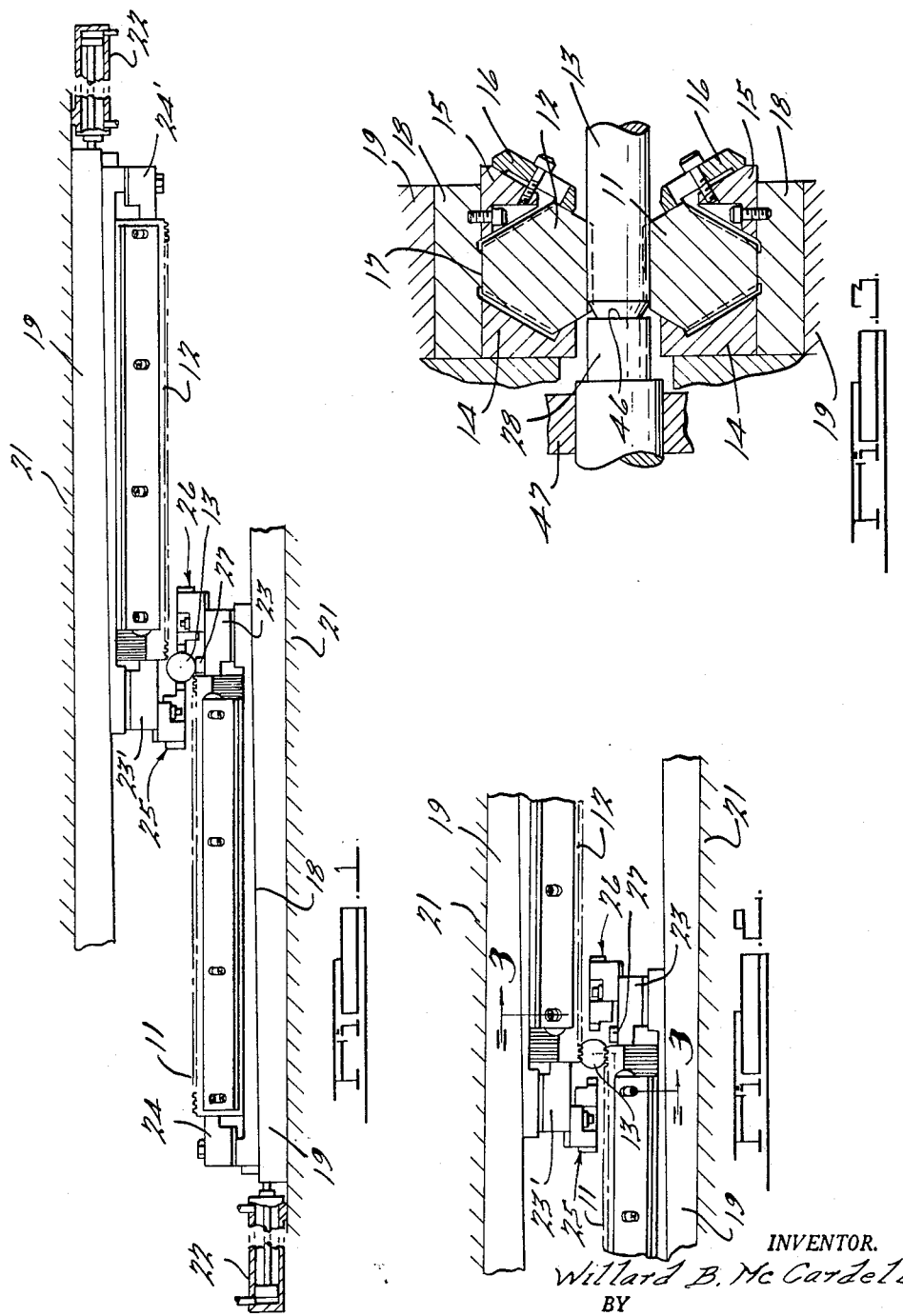

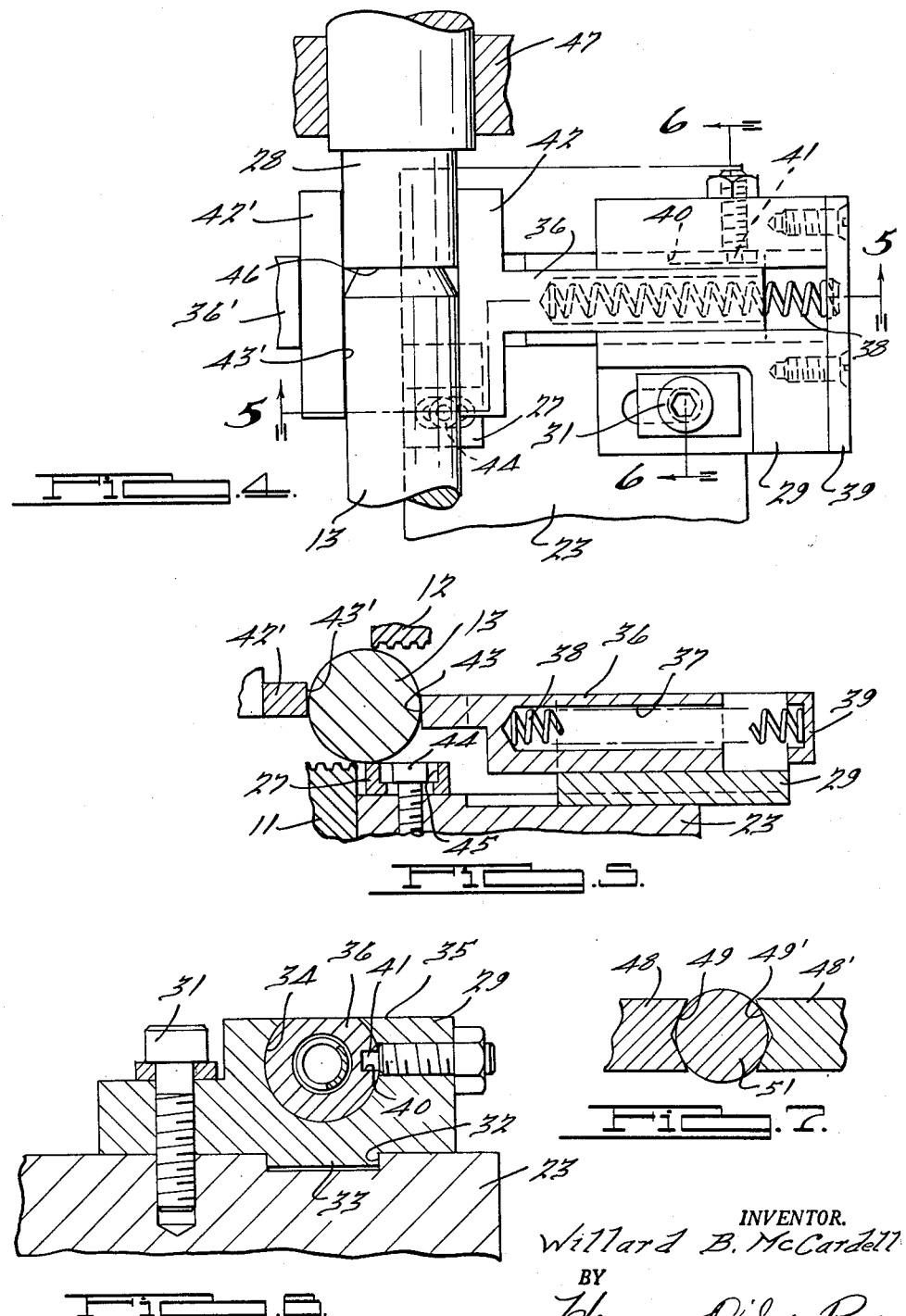

3,183,697
LOCATING FIXTURE
Willard B. McCardell, Royal Oak, Mich., assignor to Michigan Tool Company, Detroit, Mich., a corporation of Delaware
Filed Jan. 2, 1962, Ser. No. 163,667
10 Claims. (Cl. 72—88)

This invention relates to locating fixtures, and more particularly to fixtures for maintaining the position of cylindrical workpieces being acted upon by oppositely moving tooth forming tools.

It is an object of the invention to provide a novel and improved fixture which enables a cylindrical workpiece to be properly located and supported for engagement by oppositely moving tooth forming tools, without the necessity of mounting the workpiece on a fixed center.

It is another object to provide an improved fixture of this nature which will center the workpiece in three mutually perpendicular directions and will maintain the centered position until the tools grip the part so as to maintain it in position during the remainder of the tooth forming operation.

It is a further object to provide an improved center device having the above characteristics, which is versatile in nature and adapted to accommodate various workpiece diameters.

Other objects and advantages of the present invention will become apparent from the following detailed description taken in conjunction with the accompanying drawings, wherein:

FIGURE 1 is a partially schematic front elevational view showing a pair of centering fixtures constructed according to the invention and incorporated in a tooth forming rack assembly, the parts being shown in their initial position;

FIGURE 2 is a view of the central portion of FIGURE 1 but with the tools advanced sufficiently to engage the workpiece and with the fixtures in their released position;

FIGURE 3 is a cross-sectional view taken along the line 3—3 of FIGURE 2 and showing the manner in which the tools engage the workpiece as well as the locating element engaging the workpiece end;

FIGURE 4 is a top plan view of one of the fixtures and a portion of the other fixture, showing the cooperation among the fixtures, workpiece, and end element;

FIGURE 5 is a cross-sectional view in elevation taken along the line 5—5 of FIGURE 4 and showing the rest pad for vertically locating the workpiece;

FIGURE 6 is a cross-sectional view in elevation taken along the line 6—6 of FIGURE 4 and showing the mounting of the spring loaded plunger in its supporting plate; and FIGURE 7 is a fragmentary view of a modified form of plunger head in engagement with the workpiece, eliminating the necessity for the rest pad.

In general terms, one illustrated embodiment of the invention comprises four basic elements, the first and second of these elements being horizontally aligned and engaging diametrically opposite sides of the cylindrical exterior surface of a workpiece, the third element engaging the underside of the cylindrical surface along a line 90° from the first two elements, and the fourth element engaging one end surface of the workpiece. The fourth element is the same diameter as the workpiece, and the first and second elements simultaneously engage both the workpiece and the fourth element.

The first element is connected to and movable with one of a pair of tooth forming tools which is shown in copending application Serial No. 707,244, now U.S. Patent 3,015,243, filed January 6, 1958 by Joseph C. Drader and entitled Tool for Pressure Forming Toothed Elements, this application being assigned to the same assignee as the present application. The second and third elements are connected to and movable with the other of said pair of tools, while the fourth element is mounted on a fixed center. The first and second elements are spring loaded so as to maintain engagement with the workpiece and fourth element until the tools engage the workpiece, and the third element will also maintain engagement with the workpiece until this time. In this manner, the centered position of the workpiece will be maintained until the tools come into engagement with the workpiece.

In another embodiment of the invention, the first and second elements have V-shaped grooves engaging the workpiece and fourth element, thus supporting the workpiece in two mutually perpendicular directions and eliminating need for the third element.

Referring more particularly to the drawings, the invention is shown as incorporated with a pair of rack type tools 11 and 12 adapted to move on parallel beds and in opposite directions to engage the cylindrical surface of a workpiece 13 so as to form teeth thereon by a rolling or material displacement process, as described in the aforementioned copending application. The present invention is especially adapted for instances in which workpiece 13 cannot readily be mounted for rotation on a fixed center as tools 11 and 12 engage and move past the workpiece in opposite directions.

As seen in FIGURE 3, tools 11 and 12 are illustrated as being of the type having three sets of tool teeth, with clamping members 14, 15 and 16 being provided for securing each tool in position with any one set of teeth exposed for engagement with the workpiece. A supporting surface 17 is provided diametrically opposite each set of teeth, and an elongated supporting member 18 is engageable with this surface to oppose the forces acting on the tool when in operation. Supporting members 18 have slightly inclined surfaces engageable with inclined backing members 19 so that the spacing between tools 11 and 12 may be adjusted. Backing members 19 are supported on ways 21 and are actuatable in opposite directions by a pair of fluid actuated pistons and cylinders 22. The tool construction described above is shown and claimed in copending application Serial No. 75,361, now U.S. Patent 3,115,052, filed December 12, 1960 by Willard B. McCardell and entitled Tooth Forming Tool, this application being assigned to the same assignee as the present application.

Tools 11 and 12 are secured against axial shifting movement by means of a pair of blocks 23 and 24 at the forward and rear ends respectively of tool 11 and blocks 23' and 24' at the ends of tool 12, these blocks being secured to the opposite ends of members 18 and engaging the ends of tools 11 and 12. Although the action of tools 11 and 12 is described with greater particularity in the aforesaid copending applications, it may be stated that each tool has a plurality of teeth of gradually increasing size which successively engage the workpiece surface, forcing metal into interstices between the tool teeth while rolling the workpiece between the tools. The movement of the tools during operation therefore maintains the rotating workpiece 13 on fixed axis, once the leading teeth of both tools engage the workpiece.

The fixture means of this invention, as shown in FIGURES 1 to 6, comprises a first element indicated generally at 25, a second element indicated generally at 26, a third element indicated at 27 and a fourth element indicated at 28. Elements 25 and 26 are of identical construction and are secured to blocks 23' and 23 respectively.

The construction of element 26 is seen best in FIG-

URES 4, 5 and 6, the construction of element 25 being the same. Element 26 comprises a guide plate 29 secured by a bolt 31 to the upper surface of block 23. This upper surface has a longitudinal slot 32 for adjustably securing plate 29 to block 23, slot 32 extending in the direction of movement of tools 11 and 12, plate 29 having a raised portion 33 received by slot 32.

A bore 34 is formed in plate 29, the bore extending parallel to the direction of movement of the tools and being incomplete for small diameter parts in that one side is open to the upper surface 35 of plate 29, as seen in FIGURE 6. A plunger 36 is slidably mounted in bore 34, plunger 36 having an internal recess 37 at the end remote from workpiece 13. A helical compression spring 38 is disposed within recess 37 and extends outwardly therefrom, a plate 39 being secured to the end of plate 29 remote from workpiece 13 and supporting the outer end of spring 38.

A slot 40 is formed in one side of each plunger 36, and a stop 41 carried by plate 29 projects into slot 40 so as to provide limiting positions for the sliding movement of the plunger.

The end of plunger 36 facing workpiece 13 is provided with a workpiece-engaging portion 42 extending at right angles to the main extent of plunger 36. A flat surface 43 is provided on portion 42 for engaging workpiece 13. As seen in FIGURES 4 and 5, the plunger 36' of fixture element 25 has a portion 42' extending at right angles thereto, portion 42' having a flat surface 43' engageable with the side of workpiece 13 diametrically opposite that engaged by surface 43. Both plungers 36 and 36' may have flat surfaces flush with surfaces 35 of plates 29, thus permitting adequate clearance for tools 11 and 12.

The third element 27 comprises a rest pad secured by a bolt 44 to the end of block 23 nearest workpiece 13 when the parts are in their initial position. Block 23 being the lower block, rest pad 27 will thus be beneath workpiece 13, and its thickness may be so chosen as to properly locate the part in a vertical direction. The elongated slot 45 in pad 27, through which bolt 44 extends, permits adjustment of the block in a direction parallel to the movement of the tools.

Element 28 comprises a limit stop for end location of workpiece 13, the stop having a flat end surface 46 engageable by the adjacent workpiece end which is shown as chamfered for tool clearance purposes. The diameter of that portion of member 28 adjacent workpiece 13 is exactly the same as that of the workpiece, that is, it is equal to the blank diameter. The main portion of stop 46 is supported for rotation by a stationary bearing 47. The length of portions 42 and 42' of plungers 36 and 36' respectively are such that these plunger portions will simultaneously engage both stop 28 and workpiece 13. Plungers 36 and 36' will thus serve to locate and maintain the workpiece position in a direction parallel to the direction of tool movement.

In operation, the parts will have an initial position as shown in FIGURE 1, with the leading teeth of tools 11 and 12 slightly spaced from workpiece 13. At this time, element 27 will be beneath and in supporting relation with workpiece 13, and plungers 36 and 36' will engage opposite sides of the workpiece and of element 28, the springs 38 being in compressed condition and urging the plungers against the workpiece and element 28. Workpiece 13 will be placed against surface 46 of stop 28 to locate the workpiece in the direction of its axis.

Upon actuation of fluid motors 22, tool 11 will begin moving to the right in FIGURE 1 while tool 12 moves to the left. Plates 29 secured to blocks 23 and 23' will move with the tools, permitting springs 38 to expand and maintain engagement of plungers 36 and 36' with workpiece 13 and element 28. Rest pad 27 will begin to move out from under workpiece 13. The leading teeth of tools 11 and 12 will at the same time move into engagement with the upper and lower portions of the cylindrical surface of workpiece 13, as seen in FIGURE 5.

After workpiece 13 is securely held by tools 11 and 12, pad 27 will be withdrawn from beneath the workpiece. When the outer ends of slots 40 engage stops 41, further movement of tools 11 and 12 will carry plungers 36 and 36' away from engagement with workpiece 13 and stop 28. At about the same time, pad 27 will become separated from workpiece 13. The workpiece, however, will continue to be maintained in proper position by tools 11 and 12 and stop 28. When tools 11 and 12 have completed their pass with respect to workpiece 13, the workpiece will be free for removal.

FIGURE 7 shows a modified form of the invention in which plungers 48 and 48' have V-shaped grooves 49 and 49' respectively in place of flat surfaces 43 and 43'. These V-shaped surfaces will engage diametrically opposite portions of workpiece 51 and stop 28 to support the workpiece against movement in two mutually perpendicular directions, thus eliminating the necessity of providing rest pad 27 for support in a vertical direction.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In a workpiece fixture construction for use in conjunction with a plurality of tools engageable with spaced portions of the workpiece, fixture means engageable with additional spaced portions of the workpiece separated from said first-mentioned spaced portions and supporting the workpiece against movement in two mutually perpendicular directions when said tools are separated from said workpiece and means connecting said fixture means with said tools whereby movement of said tools into initial engagement with said workpiece will cause withdrawal of said fixture means from said supporting engagement with the workpiece, said connecting means permitting travel of said tools to their initial engaging position without withdrawal of said fixture means from said workpiece.

2. The combination according to claim 1, further provided with another fixture element supporting said workpiece against movement in a third direction perpendicular to said first two directions.

3. The combination according to claim 1, said fixture means being mounted adjacent and movable with the portions of said tools initially engageable with said workpiece.

4. In a locating fixture for use in conjunction with first and second oppositely movable tools simultaneously engageable with spaced portions of a cylindrical workpiece, first and second fixture elements movable with said first and second tools respectively and simultaneously engageable with opposite sides of the workpiece, separate spring means urging said first and second elements respectively against the workpiece, and means responsive to movement of said tools into initial engagement with the workpiece for causing withdrawal of said first and second elements from the workpiece.

5. The combination according to claim 4, each of said elements comprising a plunger, and a member movable with said tool, said member supporting said plunger for movement in a direction parallel to the direction of tool movement.

6. The combination according to claim 5, said spring means comprising a helical compression spring disposed within said plunger, said means for withdrawing said first and said second elements comprising a slot of predetermined length formed in said plunger, and a stop carried by said member and disposed within said slot.

7. In a locating fixture for use in conjunction with first and second oppositely moving tools adapted to simultaneously engage opposite sides of a cylindrical workpiece, a stop element having a portion engageable with one end surface of the workpiece, said portion having the same diameter as the original workpiece diameter, means supporting said stop element on a fixed axis, first and second fixture elements movably mounted with respect to said first and said second tools respectively, said fixture elements having surfaces facing opposite sides of said workpiece and being simultaneously engageable with the workpiece and stop element, separate spring means urging said fixture elements respectively against the workpiece and stop element when the tools are in a starting position out of engagement with the workpiece, and means responsive to movement of said tools into initial engagement with the workpiece for causing withdrawal of said fixture elements from contact with the workpiece and stop element.

8. The combination according to claim 7, further provided with an additional fixture element movable with one of said tools and having a surface perpendicular to said fixture element surfaces and engageable with the workpiece intermediate the engagement positions of said first and second fixture elements, said additional element being movable out of engagement with said workpiece at approximately the same time as said first and second fixture elements.

9. The combination according to claim 7, the surfaces of said first and second fixture elements being recessed so as to support said workpiece against movement in two mutually perpendicular directions.

10. In a locating fixture for use in conjunction with first and second rack type tools movable in opposite directions and simultaneously engageable with opposite sides of a cylindrical workpiece, means for supporting said tools, first and second fixture elements secured to said tool supporting means forwardly of the forward ends of said first and second tools respectively, each of said fixture elements comprising a guide member having a recess extending parallel to the direction of tool movement, a plunger slidably mounted in said guide member recess, stop means for limiting the sliding movement of said plunger, and a spring urging each plunger towards its respective tool, the plungers having surfaces adjacent the workpiece extending transversely to the direction of tool movement, an end stop element having a portion of the same diameter as the workpiece blank diameter and supported on a fixed axis, said stop element portion being engageable by one end of the workpiece, said transverse surfaces of the first and second fixture elements being simultaneously engageable with diametrically opposite sides of said stop element portion and workpiece, and a rest pad mounted at the forward end of one of said tools and having a surface perpendicular to said transverse fixture element surfaces and engageable with the workpiece at a position intermediate the engagement positions of the first and second fixture elements, the positions of said stop means and said rest pad being such that said first and second fixture elements and said rest pad will be withdrawn from engagement with the workpiece after said tools have initially engaged the workpiece when commencing their operating strokes.

References Cited by the Examiner

UNITED STATES PATENTS

| | | | |
|---|---|---|---|
| 2,364,442 | 12/44 | Hoern | 80—8 |
| 2,367,398 | 1/45 | Hoern | 80—8 |
| 2,760,388 | 8/56 | Seibert | 80—8 |

WILLIAM J. STEPHENSON, *Primary Examiner.*

LEON PEAR, *Examiner.*